United States Patent
Speldrich et al.

(10) Patent No.: US 6,655,207 B1
(45) Date of Patent: Dec. 2, 2003

(54) FLOW RATE MODULE AND INTEGRATED FLOW RESTRICTOR

(75) Inventors: Jamie W. Speldrich, Freeport, IL (US); Ulrich Bonne, Hopkins, MN (US); Martin G. Murray, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/505,135

(22) Filed: Feb. 16, 2000

(51) Int. Cl.⁷ ................................................ G01F 5/00
(52) U.S. Cl. ................ 73/202.5; 73/204.21; 73/861.52; 73/861.61
(58) Field of Search .................. 73/861.52, 861.69, 73/52, 63, 202.5, 204.21

(56) References Cited

U.S. PATENT DOCUMENTS

| | | | |
|---|---|---|---|
| 3,559,482 A | * 2/1971 | Baker et al. ............... 73/202.5 |
| 3,981,074 A | 9/1976 | Yamamoto et al. | |
| 4,326,214 A | 4/1982 | Trueblood | |
| 4,411,292 A | * 10/1983 | Schiller ..................... 138/42 |
| 4,418,723 A | * 12/1983 | Koni et al. ............... 73/861.52 |
| RE31,570 E | * 5/1984 | Drexel ..................... 73/202 |
| 4,655,088 A | 4/1987 | Adams | |
| 4,672,997 A | 6/1987 | Landis et al. | |
| 4,829,818 A | 5/1989 | Bohrer | |
| 4,856,328 A | 8/1989 | Johnson | |
| 4,976,283 A | * 12/1990 | Wildfang et al. ............ 137/504 |
| 5,063,787 A | * 11/1991 | Khuzai et al. ............ 73/861.64 |
| 5,107,441 A | * 4/1992 | Decker ..................... 702/47 |
| 5,231,877 A | 8/1993 | Henderson | |
| 5,319,973 A | 6/1994 | Crayton et al. | |
| 5,385,046 A | 1/1995 | Yamakawa et al. | |
| 5,400,973 A | * 3/1995 | Cohen .................. 233/533.1 |
| 5,404,753 A | 4/1995 | Hecht et al. | |
| 5,609,303 A | * 3/1997 | Cohen .................... 239/542 |
| 5,634,592 A | * 6/1997 | CAmpau ................. 239/51 |
| 5,717,145 A | 2/1998 | Yasuhara et al. | |
| 5,741,968 A | 4/1998 | Arai | |
| 5,750,892 A | 5/1998 | Huang et al. | |
| 5,763,787 A | 6/1998 | Gravel et al. | |
| 5,829,685 A | * 11/1998 | Cohen .................. 239/533.1 |
| 5,844,135 A | 12/1998 | Brammer et al. | |
| 5,942,694 A | 8/1999 | Robins et al. | |
| 6,128,963 A | * 10/2000 | Bromster ................. 73/861.52 |
| 6,247,495 B1 | * 6/2001 | Yamamoto et al. .... 137/599.13 |

FOREIGN PATENT DOCUMENTS

| | | |
|---|---|---|
| GB | 2 123 564 A | 2/1984 |
| WO | WO 01 11322 A | 2/2001 |

OTHER PUBLICATIONS

PCT International Search Report, Sep. 25, 2001, International Application No. PCT/US 01/05220.

* cited by examiner

*Primary Examiner*—Edward Lefkowitz
*Assistant Examiner*—Andre Allen
(74) *Attorney, Agent, or Firm*—Kris T. Fredrick

(57) ABSTRACT

An integrated module is provided for measuring a flow rate of a fluid, whether gaseous or liquid, with a flow restrictor comprising a plurality of orifices adapted to a flow channel of the integrated module and a sensor mounted to measure a property of the fluid at said flow restrictor corresponding to the flow rate. The integrated module provided may be used in numerous flow systems, such as reactors, ventilators and respirators, and has the benefit of better laminarization of the flow as well as better calibration between the flow sensor and the flow restrictor for more accurate flow measurements.

34 Claims, 9 Drawing Sheets

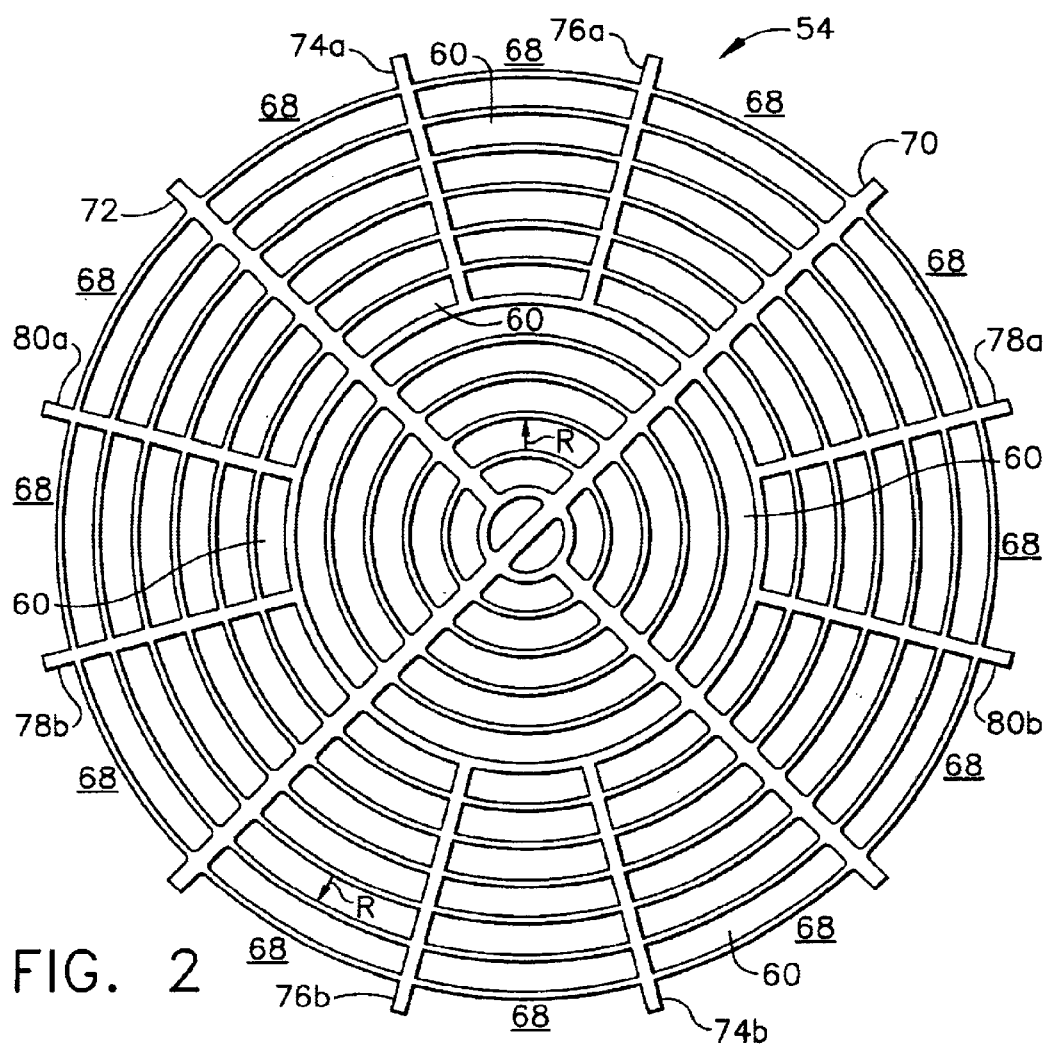
FIG. 2
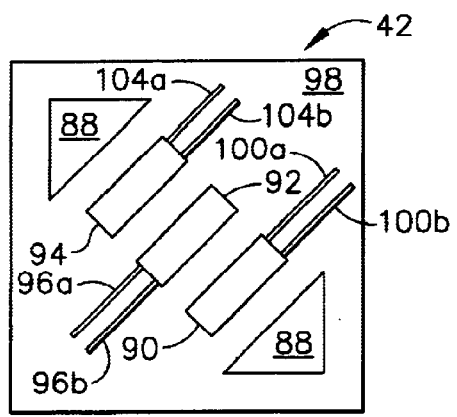
FIG. 3  AIR FLOW

FLOW RATE MODULE AND INTEGRATED FLOW RESTRICTOR

BACKGROUND OF THE INVENTION

1. Field of the Invention

The present invention relates generally to flow sensors and, more particularly, to a flow sensor with an integrated flow restrictor.

2. Description of Related Technology

Flow rate control mechanisms are used in a variety of flow systems as a means for controlling the amount of fluid, gaseous or liquid, traveling through the system. In large-scale processing systems, for example, flow control may be used to affect chemical reactions by ensuring that proper feed stocks, such as catalysts and reacting agents, enter a processing unit at a desired rate of flow. Additionally, flow control mechanisms may be used to regulate flow rates in systems such as ventilators and respirators where, for example, it may be desirable to maintain a sufficient flow of breathable air or provide sufficient anesthetizing gas to a patient in preparation for surgery.

Typically, flow rate control occurs through the use of control circuitry responsive to measurements obtained from carefully placed flow sensors. One such flow sensor is a thermal anemometer with a conductive wire extending radially across a flow channel and known as a hot-wire anemometer. These anemometers are connected to constant current sources which cause the temperature of the wire to increase proportionally with an increase in current. In operation, as a fluid flows through the flow channel and, thus, past the anemometer, the wire cools due to convection effects. This cooling affects the resistance of the wire, which is measured and used to derive the flow rate of the fluid. Another form of thermal anemometer flow sensor is a microstructure sensor, either a microbridge, micro-membrane, or micro-brick, disposed at a wall of a flow channel. In this form, the sensors ostensibly measures the flow rate by sampling the fluid along the wall of the flow channel. In either application, the thermal anemometer flow sensor is disposed in the flow channel for measuring rate of flow.

There are numerous drawbacks to these and other known flow sensors. One drawback is that the proportional relationship upon which these sensors operate, i.e., that the conductive wire or element will cool linearly with increases in the flow rate of the fluid due to forced convection, does not hold at high flow velocities where the sensors become saturated. This saturation can occur over a range from 10 m/s to above 300 m/s depending on the microstructure sensor, for example. As a result, in high flow regions, measured resistance of an anemometer, or other sensor, no longer correlates to an accurate value of the flow rate. Furthermore, because these sensors reside in the main flow channel, they are susceptible to physical damage and contamination.

In addition to these drawbacks, known flow sensors are susceptible to mis-measurement due to turbulent flow effects, i.e., non-uniformity in flow velocity and pressure, both of which exist to some degree in all flow systems. Furthermore, conventional hot-wire anemometers have a slow time response and therefore do not produce accurate flow rate values upon abrupt changes in flow velocity. In addition, they require high input power to keep the entire length of wire at an elevated temperature at zero flow.

In contrast, wall-mounted thermal microstructures may have a relatively fast time response, but offer little advantage over the hot-wire anemometers because their response times are too fast, producing flow rate values that fluctuate with turbulence conditions instead of averaging out the noise associated with such turbulence. Therefore, as the flow rate of the fluid increases, turbulence increases and the wall-mounted thermal microstructure will produce increasingly erratic measurements in response thereto.

An indirect flow sensor measuring technique that measures flow rate from a sensor positioned outside of the flow channel and improves upon some of the drawbacks of the foregoing, has been designed. In one form, $\Delta P$ pressure sensors measure a pressure drop across a flow restrictor, which acts as a diameter reducing element in the flow channel thereby creating a difference in pressure between an entrance end and an exit end of the flow restrictor. These flow restrictors have been in either honeycomb-patterned or porous metal plate flow restrictors. The pressure sensors are disposed in dead-end channels to measure the pressure drop due to the flow restrictor, with this pressure drop being proportional to the flow rate of the fluid. In other forms, the indirect flow mechanism can use a translucent tube disposed near the flow channel with a free-moving ball or indicator that rises and falls with varying flow rate conditions in the flow channel, or a rotameter, such as a small turbine or fan, that operates as would a windmill measuring wind rate.

Though they offer some improvements over sensors disposed directly in the flow channel, all of these indirect flow sensors are hampered by calibration problems. An indirect flow sensor may be calibrated to work generally with certain types of restrictors, e.g., honeycomb restrictors, but imprecise restrictor geometry results in variations in pressure and, therefore, variations in measured flow rate. And, furthermore, the sensors are not calibrated for use with other types of restrictors.

In addition to these deficiencies of indirect flow sensors, known flow restrictors further hamper flow measuring mechanisms because they do not produce uniform, laminarizing flow of the fluid. Non-uniformities in the cross-sectional area and position of the orifices in known flow restrictors result in such non-uniform flow, an example of which occurs in a honeycomb restrictor where orifices abutting the outer wall of the flow channel are truncated to conform the restrictor to circular shape of the wall. Moreover, non-linear correlations between pressure and flow rate result from this non-uniformity, especially at higher flow rates.

Therefore, to overcome the foregoing shortcomings, it is desirable to have a flow sensor and integrated flow restrictor that reduces calibration errors and that is adapted to reduce the flow rate measurement errors created by turbulence effects at the outer edges of the flow channel and to do so at an affordable cost.

SUMMARY OF THE INVENTION

In accordance with an aspect of the invention, an integrated module for measuring a flow rate of a fluid in a flow system has a housing that defines a flow channel through which a portion of the fluid flows and a flow restrictor, with an entrance end and an exit end, disposed in the flow channel. The flow restrictor comprises a plurality of orifices adapted to the flow channel to produce substantially uniform flow across the flow channel at the exit end.

In accordance with another aspect of the invention, a module for measuring a flow rate of a fluid in a flow system is provided with a flow restrictor disposed in a flow channel; a flow sensor disposed in a sensing channel communicating with the flow channel via a sensing tap with an inlet end and an outlet end such that the flow restrictor creates a pressure drop across the sensing channel allowing a portion of the fluid in the flow channel to flow into the sensing channel; and a housing wherein the flow restrictor, the flow sensor, and the sensing channel are integrally formed.

In accordance with yet another aspect of the invention, a flow restrictor, for use in a flow channel, comprises a plurality of orifices adapted to the flow channel to produce a substantially uniform flow across the flow channel at an exit end of the flow restrictor.

BRIEF DESCRIPTION OF THE DRAWINGS

FIG. 2 is a front view of the flow restrictor in the preferred embodiment of the invention.

FIG. 3 is a top view of an exemplary flow sensor that may be used in the invention.

DETAILED DESCRIPTION OF THE PREFERRED EMBODIMENTS

Figure 1:
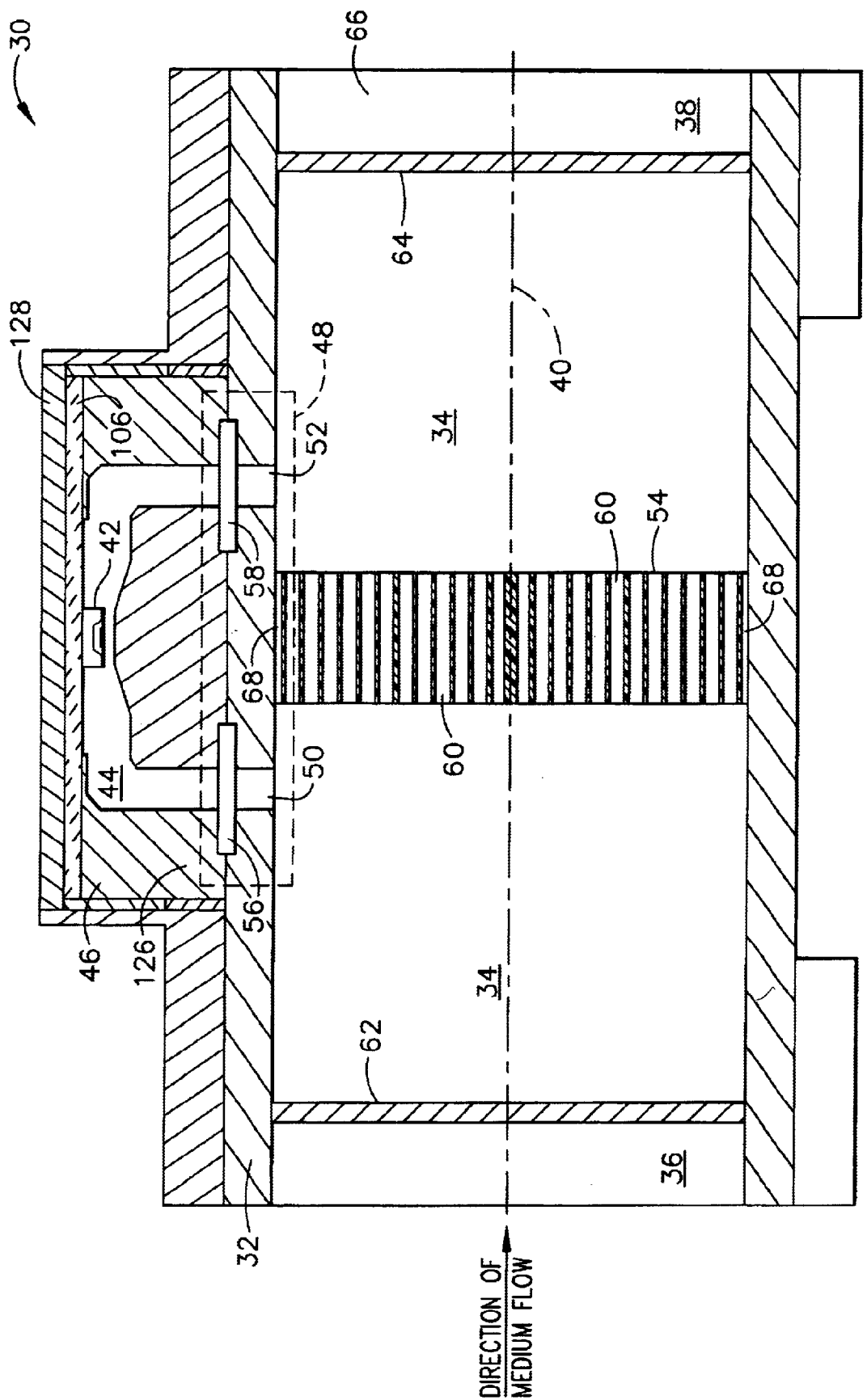
FIG. 1 is a cross-sectional view of an integrated module in accordance with the invention, wherein a flow restrictor, flow sensor, and housing are shown.

An integrated module 30 for use in a flow system to measure the rate of flow of a fluid therein is provided in FIG. 1. As will be apparent from the following description, the integrated module 30 may be used in numerous flow systems in which flow rate measurement is necessary, such as in a ventilator or a respirator. Further, the integrated module 30 is an improvement over the prior art addressing one or more of the problems thereof, as described above, including having a flow channel with an integrated flow restrictor and flow rate sensor that allows for calibrated flow rate measurements.

The integrated module 30 comprises a housing 32 defining a flow channel 34 into which an entering fluid may flow from a flow system via an inlet end 36, with the fluid exiting the flow channel 34 at an outlet end 38. The flow channel 34 preferably has a cross-sectional shape and size compatible with that of existing flow systems, such as to fit a 22 mm conical connector as used in ventilators and respirators and which allows approximately 200 L/min of flow rate for the entering fluid. Other diameters and varying diameters may be used. However, to ensure that the integrated module 30 is calibrated to measure an accurate flow rate of the fluid and to maintain the flow rate at the outlet end 38 at substantially the same rate as at the inlet end 36, the flow channel 34 is designed to have substantially the same cross-sectional shape and size throughout a length running along an axis 40.

The integrated module 30 has a flow sensor 42 disposed in a bypass sensing channel 44 parallel to the flow channel 34. The sensor 42 is preferably a microbridge sensor as exemplarily shown in FIG. 3 and discussed below. In operation, as the fluid flows through the flow channel 34 in the direction indicated, a portion of the fluid flows through the sensing channel 44 so that the flow sensor 42 can measure the flow rate of the fluid in the flow channel 34 indirectly without being exposed to the damage or fluctuating conditions existing in typical flow channels. In FIG. 1, the sensing channel 44 is formed by disposing a flow tube 46 over a sensing tap 48 in the flow channel 34, communicating therewith, that allows a portion of the entering fluid to flow into the sensing channel 44. Typically, the flow rate of the fluid in the sensing channel 44 will be a fraction of the flow rate of the fluid in the flow channel 34.

The sensing tap 48 of the embodiment in FIG. 1 is formed from an inlet tap 50 and an outlet tap 52 shaped with a circular cross-sectional shape, disposed on opposing sides of an entrance end (closest to the inlet end 36) and an exit end (closest to the outlet end 38) of a flow restrictor 54. The circular inlet and outlet taps 50, 52 terminate at mounting indentations 56, 58, respectively, which are fitted to receive O-rings for sealibly mounting the flow tube 46 to the sensing tap 48 to reduce leakage of the tapped portion of the fluid. Though the sensing tap 48 is shown with two taps 50, 52, other numbers of taps could be used and other methods of communicating flow from the channel 34 to channel 44 may be used. And, such other methods are considered within the scope of the invention.

The flow restrictor 54 creates a pressure drop across the inlet 50 and outlet 52 of the sensing channel which facilitates fluid flow into the sensing channel 44. This pressure drop, or pressure differential, is dependent on restrictor geometry and increases with flow rate. Furthermore, the fluid in the flow channel will have an increasingly turbulent flow as the flow rate of the fluid increases, i.e., an increasing non-uniform pressure and velocity across a given plane orthogonal to the direction of flow. In response, the flow restrictor 54, in addition to creating a pressure drop, straightens and laminarizes the flow in the flow channel 34, thereby reducing turbulence. The flow restrictor 54 reduces turbulence by forcing the fluid to flow through a series of equally spaced orifices 60. The pressure drop across the flow restrictor 54 is also dependent on the size and uniformity of these orifices 60. To further straighten and laminarize the fluid flow in the flow channel 34, two optional screens, an inlet screen 62 and an outlet screen 64 formed preferably of a honeycomb-patterned structure like those currently available, may be positioned upstream and downstream of the flow restrictor 54, respectively.

With the flow restrictor 54 of FIG. 2, for example, the orifices 60 are circular and concentrically spaced about the axis 40, which extends normal to FIG. 2. Due to the large number of orifices 60 in the flow restrictor 54, only a few are provided with reference numerals in FIG. 2. Each orifice 60 has a radial distance, R, of approximately 0.085 inches. In the preferred form, the orifices 60 are circular to adapt the flow restrictor 54 to the shape of the flow channel 34. This shape matching results in more uniform reduction of turbulence across the entire flow channel 34. Nevertheless, other geometries of orifices adapted to arbitrary cross-sectional shapes of the flow channel 34 and extending substantially parallel to the axis 40 therein may be employed. These could have a uniform repeating pattern of orifices of substantially identical hydraulic diameter throughout or a partially-repeating pattern in which orifices are symmetrically aligned about the axis 40 with other orifices of substantially the same hydraulic diameter. Other variations will be obvious from the disclosure.

The flow restrictor 54 is made from a material strong enough to withstand high flow rates of over 6000 L/min, and can be formed from multiple pieces affixed together or from a single molded structure. It is desirable to have the flow restrictor 54 formed of a temperature resistant material of high modulus of elasticity. Furthermore, for use in applications such as anesthetizing apparatus where high concentrations of potentially damaging chemicals are used or in medical applications generally where potentially damaging cleaning agents are used, the flow restrictor 54 should be made from a material that is also chemically resistant. In addition, the flow restrictor 54 requires thin walls to minimize turbulence. To this end, the flow restrictor 54 is preferably made of a nylon 6/6 resin, e.g., RTP 201™ resin available from RTP Corporation of Illinois. Nylon resins are processible by injection molding, foam molding or extrusion techniques and demonstrate minimal creep defects under high load. Therefore, the use of this resin allows the flow restrictor 54 to be easily manufactured and to achieve very long useful lifetimes under heavy load conditions. In particular, nylon resins have proven more manufacturable than other materials because of their ability to uniformly fill all intricate details of the mold used to form the flow restrictor 54 and/or integrated module 30, before hardening into the final structure. The RTP 201™ resin with 10% glass fill has a tensile strength of approximately 14,000 psi and an elastic modulus of approximately 700,000 psi. Those of ordinary skill in the art will appreciate that other similar materials can be used to form the flow restrictor 54. For example, a polyetherimide resin such as an Ultem® 2210 resin with 20% glass by weight, available from General Electric Co., could be used. This polyetherimide resin forms a material more amorphous than semi-crystalline plastics which produce non-uniform shrinkage in the mold causing slightly warped structures. In addition, the flow restrictor 54 may be formed of various metals, plastics, resins, ceramics, or liquid crystal polymers (LCPS) which exhibit similar properties as those provided above.

As discussed above, the orifices 60 of the flow restrictor 54 have been shaped to match the curvature of an outer wall 66 of the flow channel 34. By utilizing the shape of the outer wall to create orifices of substantially the same circular shape, the flow restrictor 54 is adapted to the flow channel to reduce the non-uniform velocity effects present at the outer walls with previously known flow restrictors. Each orifice 60 is disposed concentrically with each other, with the outer wall 66, and with the axis 40. Moreover, the flow restrictor 54 has outer orifices 68 which are partially formed by the flow channel wall 66 (FIG. 1) and are uniform in shape and concentric with orifices 60. Two main support rods 70, 72 extend radially across the flow restrictor 54 to support the same and to give points of contact for affixing the flow restrictor 54 rigidly into the flow channel 34, if necessary.

Alternatively, and preferably, the flow restrictor 54 can be formed integrally with the housing 32 and outer wall 66 by using a single casting mold for the entire structure. In this form, the integrated module 30 could be entirely formed of a moldable nylon resin or the other materials referenced above. In fact, the integrated module 30 is preferably formed entirely of a nylon resin. The use of this material also gives the outer wall 66 sufficient smoothness to allow the fluid to travel through the flow channel 34 with a reduced amount of turbulence.

In addition to the two main support rods 70, 72, numerous support pairs formed of two smaller support rods aligned radially with one another are used (shown as pairs 74a, 74b, 76a, 76b, 78a, 78b, and 80a, 80b). The support pairs 74a, 74b through 80a, 80b provide additional support to the flow restrictor 54 preventing those portions of the orifices 60 between the main support rods from moving during high flow rate usage, whereas without such support pairs, the flow restrictor 54 could move, or rattle, resulting in less reduction in turbulence of the fluid and more noise measured by the sensor 42. Thus, this rigidity reduces noise in the system thereby allowing the use of a higher sensitivity sensor 42. The support pairs are formed of these smaller support rods 74a, 74b through 80a, 80b, in such a way as to form identical, mirrored orifices on each side of the axis 40 along a given radial distance, with uniformity in orifice structure and diameter being important to laminarizing the flow fluid. That is, by using the main support rods 70, 72 and support pairs 74a, 74b through 80a, 80b in this symmetrical way, any orifice 60 will be symmetric with an identical orifice 60 of equal hydraulic diameter. As is known, when the width of an opening is much greater than the distance (r) across the opening, the hydraulic diameter is approximately equal to 2r. The symmetrical and uniform hydraulic diameters of the orifices 60, 68 create uniform flow velocity at the exit end 38.

The flow rate sensor 42 is shown in FIG. 3 for exemplary purposes only because, as will be appreciated by persons of ordinary skill in the art, many types of flow sensors may be used in addition to those shown by Bohrer in U.S. Pat. No. 4,478,076 and Johnson et al. in U.S. Pat. No. 4,651,564 including optical flow sensors, orifice-based ΔP sensors, and pitot tubes. With the thermal microstructure form of sensor 42 being only exemplary, the operation of the flow rate sensor 42 will only be generally described below.

Figure 4:
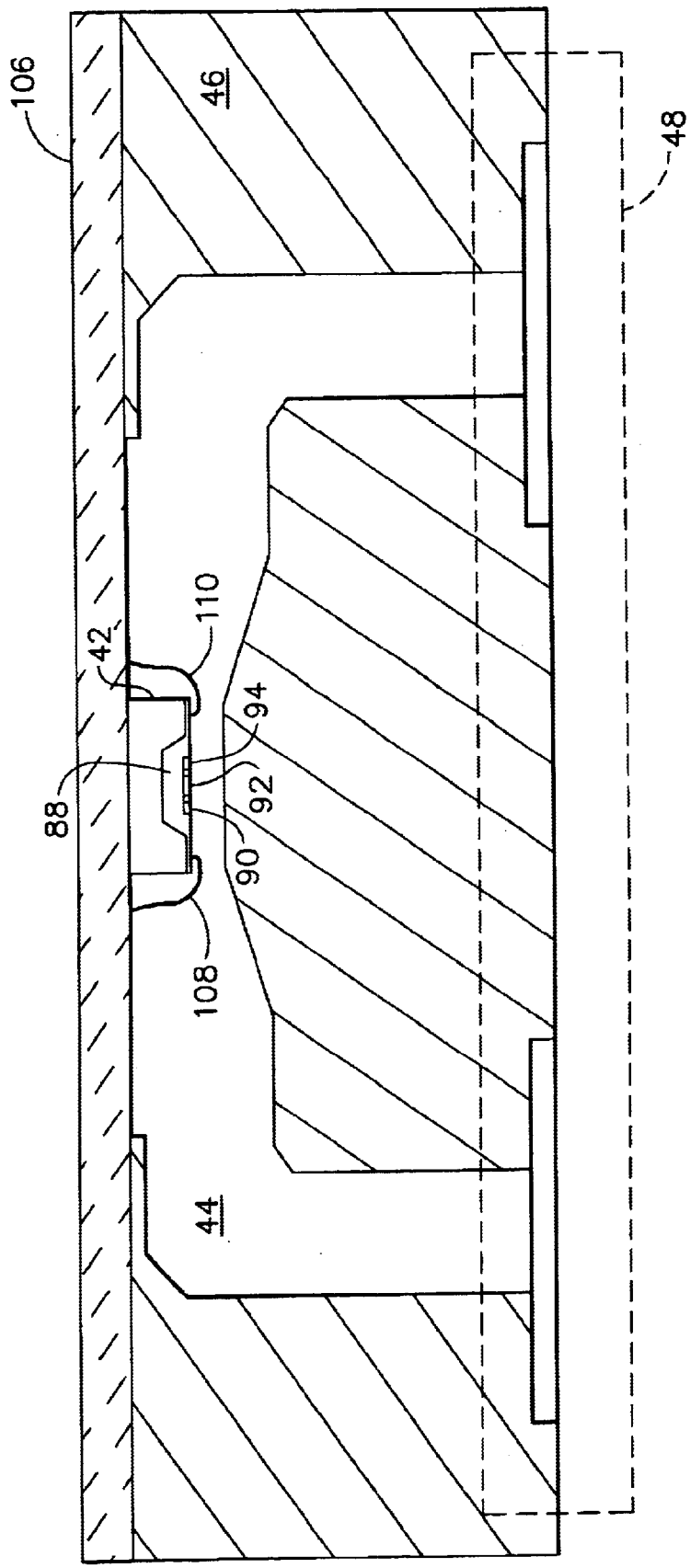
FIG. 4 is a cross-sectional view of the flow sensor of FIG. 3 with an integrated flow tube disposed thereon in accordance with an embodiment of the invention.

As a microbridge structure, the sensor 42 comprises a microchannel 88 that defines an air space into which some of the fluid flowing into the sensing channel 44 will flow, in the direction indicated. The fluid will flow across an upstream sensor 90, a heater 92, and a downstream sensor 94. In principle, the heater 92 is heated to approximately 160° C. above ambient temperature via the application of a current to a conductive wire or pattern through two heater leads 96a, 96b. Under no flow conditions, the upstream sensor 90 and the downstream sensor 94 would both read the same temperature due to the heater 92, i.e., both sensors would have the same measured resistance values because both are equally-spaced from the heater 92. The resistance values of the sensors 90, 94 are measured from the application of a constant current to a conductive wire or pattern forming the sensors 90, 94. As the fluid enters the flow channel 34, a portion thereof enters the sensing channel 44 with an even smaller portion thereof enters the microchannel 88 (FIG. 4), creating a flow path across the top and bottom surfaces of the heater 92 and sensors 90, 94. Convection from the flow of the fluid moves heat produced by the heater 92 away from the upstream sensor 90 and towards the downstream sensor 94, resulting in a reduction of temperature of the former and an increase in temperature in the latter. The change in temperatures produces a corresponding change in the resistance values of each sensor, with the upstream sensor 90 seeing a lower temperature therefore lower resistance and the downstream sensor 94 seeing higher temperature therefore a higher resistance. The difference between the resistance values for the two sensors 90, 94 is measured by circuitry (not shown) and used to determine the flow rate of the fluid in the sensing channel 44 from which the flow rate of the fluid in channel 34 can be determined.

Figure 5:
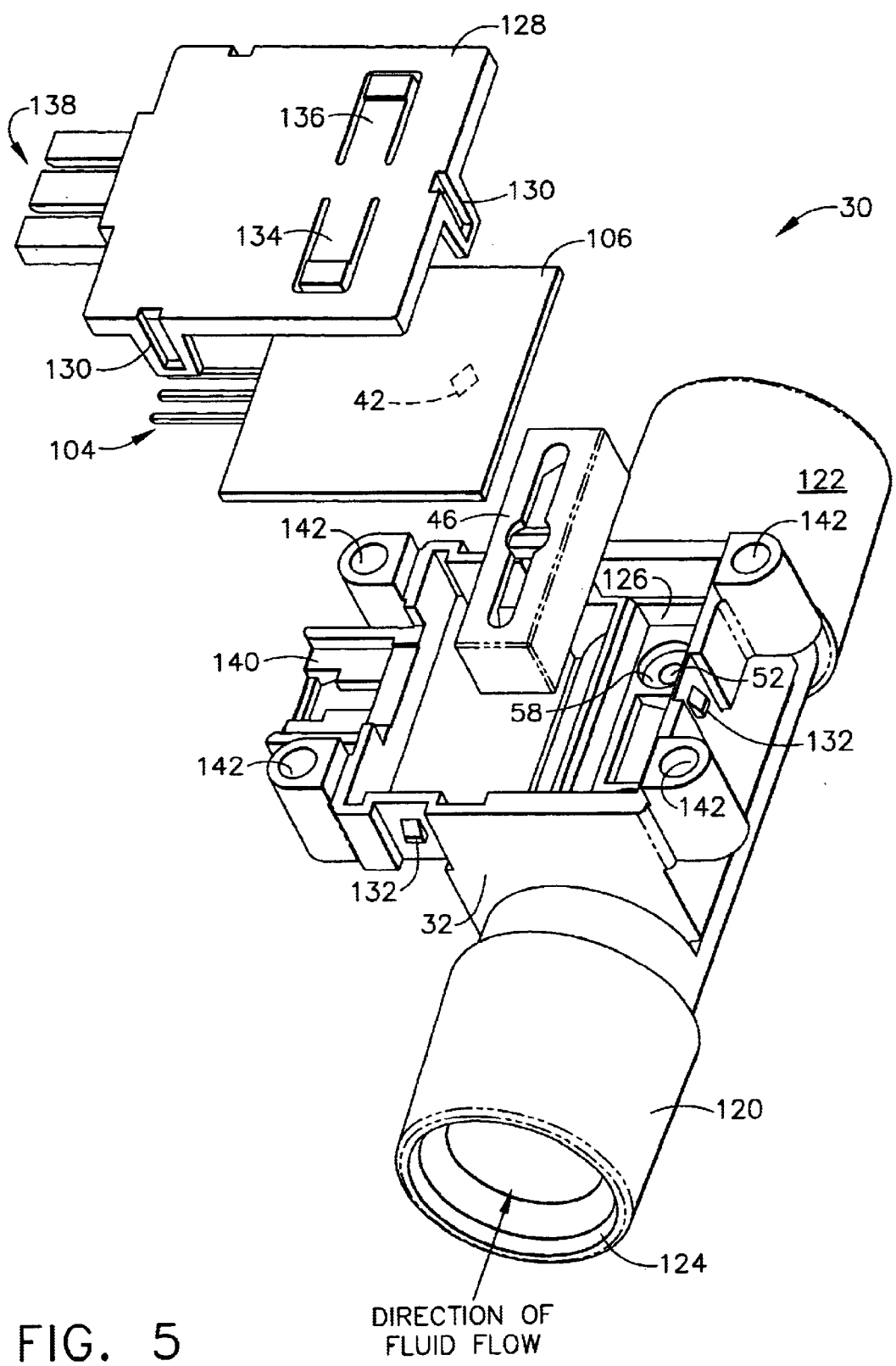
FIG. 5 is a trimetric view of a pre-assembled molded integrated module in accordance with a first embodiment of the invention in which the module is formed of a singular structure.

The entire sensor 42 may be formed on a silicon, or other insulating semiconductor, substrate 98 upon which sits heater leads 96a, 96b, upstream sensor leads 100a, 100b, and downstream sensor leads 104a, 104b for connecting to control or biasing circuitry (not shown) through wire leads like the exemplary three-wire lead 104 of FIG. 5, with input, output, and ground leads that are used to control the heating and sensing functions of the sensor 42.

The sensor 42 is integrated with the flow channel 34 containing the flow restrictor 54 by affixibly mounting the sensor 42 onto the housing 32 to form the sensing channel 44. Preferably, the sensor 42 is first adhesively mounted to a substrate base 106, supporting the lead 104 and providing a wire-bond connection thereto, which is then adhesively mounted to the flow tube 46 creating the structure of FIG. 4. The substrate 106 can be formed of an alumina ceramic, for example. An epoxy is used for the adhesive mounting. Wire bonds 108, 110 extending from the sensor 42 are attached to conductive pads on the substrate 106 before the substrate is mounted to a top opening in the flow tube 46 (FIG. 5). These wire bonds 108, 110. connect directly to the wire leads 104 via the conductive pads depending on the design of the sensor 42 and substrate 106.

The flow tube 46 is compatible with attachment to the sensing tap 48 for forming an air tight sensing channel parallel to the flow channel. The flow tube 46 can be made of an nylon resin, ceramic or other above-mentioned materials. By epoxying the flow tube 46 to the substrate 106, the microchannel 88 will be exposed to receive a portion of the fluid that flows into the sensing channel 44. An advantage of affixing the flow tube 46 directly to the substrate 106 before mounting it onto the housing 32 is that the combined structure can be more easily attached to the integrated module 30 in an aligned position with the more sensitive alignment of the microchannel 88 having already occurred. This method also helps protect the wire bonds 108, 110 during assembly.

As stated above, the integrated module 30 is designed to be installed into existing flow systems, and to facilitate this installation in one embodiment the integrated module 30 is formed of a housing with molded inlet and outlet mounts 120,122 as shown in FIG. 5. The inlet and outlet mounts 120, 122 are preferably 22 mm conical connectors which are easily adapted for use in a flow system. The entire structure, i.e., including the housing 32, the inlet mount 120, and the outlet mount 122, can be formed of the nylon resin or other materials referenced above. Alternatively, the conical mounts 120, 122 can be replaced by threaded screw mounts or rubber O-ring connections to sealibly connect with an existing flow system. Furthermore, the inlet and outlet mounts 120,122 can have a screen recess space 124 for optionally placing the upstream inlet screen 62 and a downstream outlet screen 64 of FIG. 1.

The integrated module 30 of FIG. 5 is further depicted with a rectangularly shaped sensing tap recess 126 into which the flow tube 46 will be sealed, with the recess 126 extending from the inlet end 50 (not shown) to the outlet end 52 of the sensing tap 48. The mounting indentation 58 for the outlet end 52 is also depicted and, along with the mounting indentation 56 for the inlet end 50, is sized to receive rubber O-rings for sealibly attaching the flow tube 46 to the recess 126.

A cover 128, disposed against the rear side of the substrate 106 opposite the sensor 42 (shown in phantom), protects the sensor 42 from environmental effects and clamps the sensor 42 and flow tube 46 against the sensing tap 48 of the housing 32. Clamping is achieved primarily in two ways. First, notches 130 on the cover 128 are disposed to snap in place over pegs 132 of the housing 32. Second, the cover 128 has two oppositely disposed, horseshoe-=shaped tabs 134, 136 that are flexible in a spring-like manner. As the cover 128 is snapped into place over the pegs 132, the two tabs 134, 136 will contact the top surface of the substrate 106 and thereby protrude slightly upward while applying a restraining downward force onto the substrate 106. The cover 128 can be made from similar resins as the other components. Additionally, the cover 128 also has an upper connection portion 138 which forms an electrical receptacle with a lower connection portion 140 of the housing 32, both of which house the wire lead 104 when the cover is snapped in place to form an electrical receptacle for connecting the lead 104 to external circuitry.

Figure 6:
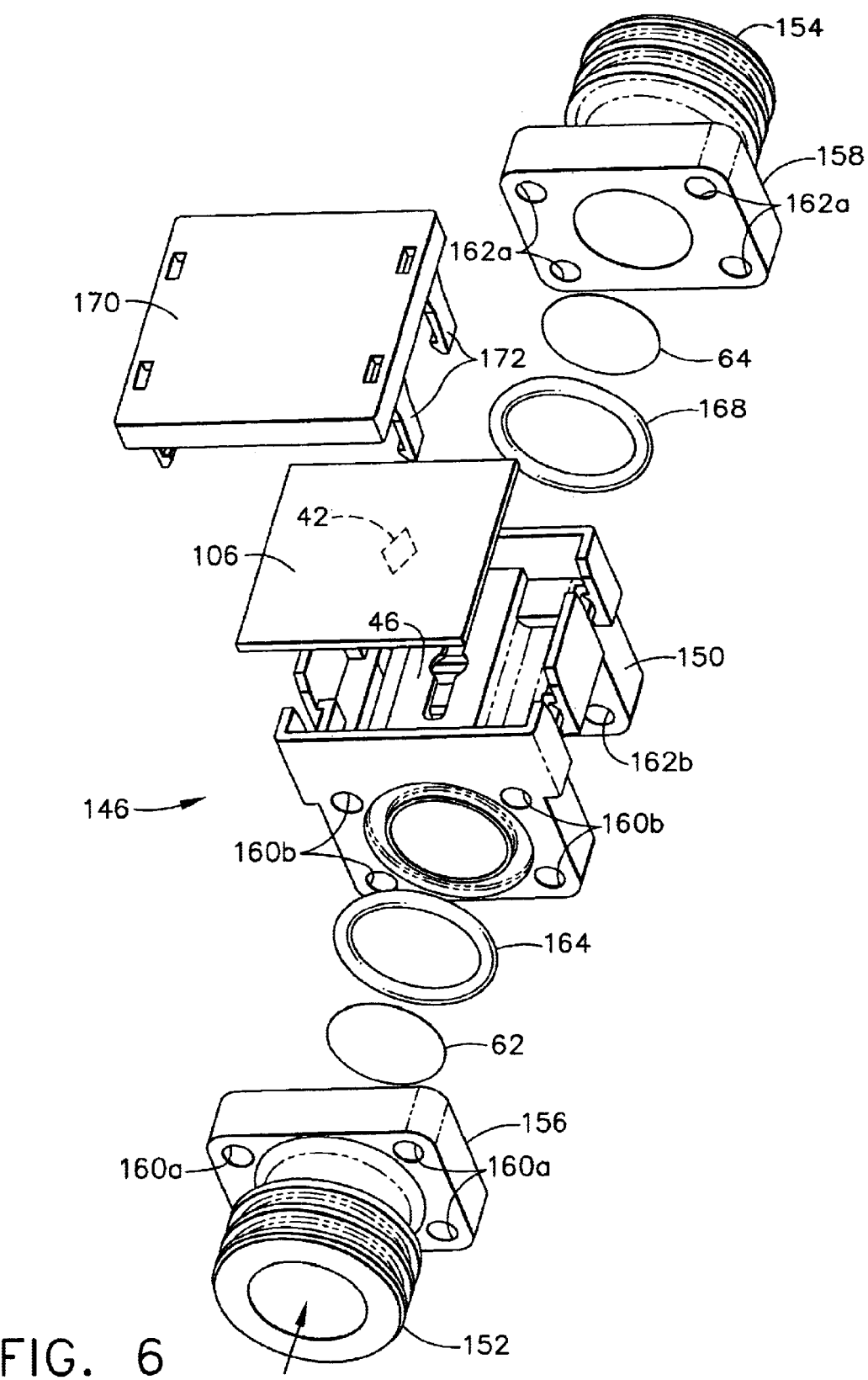
FIG. 6 is a trimetric view of a pre-assembled integrated module in accordance with a second embodiment of the invention in which the module is formed of adapters for connecting to an existing flow system.

An alternative embodiment of an integrated module 146 is shown in FIG. 6, wherein a housing 150 defining the flow channel 34 is formed with an inlet mount 152 and an outlet mount 154 which are attached to adaptors 156, 158, respectively. Thus, the housing 150, inlet mount 152, and outlet mount 154 are not formed of a single molded structure like that of the embodiment in FIG. 5. The integrated module 146 uses the sensor 42. The embodiment of FIG. 6, however, shows an alternative means of mounting the sensor, whereby the flow tube 46 is affixed to the housing 150 before the substrate 106 is epoxied to the flow tube 46. The mounting steps of FIG. 5 could also be used.

The integrated module 146 requires less manufacturing expense; is packaged in a smaller form; and allows the customer greater versatility in mounting than the embodiment of FIG. 5. For example, a customer may prefer that the mounts 152 and 154 take the form of rubber O-rings which can be placed into adaptors 156, 158 or tapered threaded screw mounts, either of various sizes. Alternatively, the customer could choose to clamp the module 146 to a manifold.

Screw mounting through holes 160a,160b and 162a, 162b may be used to attach the adaptors 156, 158, respectively, to the housing 150 at the manufacturing facility. An epoxy, heat-stake, or other method may also be used instead. Further, O-rings 164, 168 may used to form a better contact between the adaptors 156, 158 and the housing 150. Optional screens 62, 64 may be placed on either an inlet end or an outlet end of the flow channel 34, or both. Moreover, the adaptors 156, 158 have industry standard end connections that can receive standard 22 mm conical connectors (ISO 5356), such as those used in ventilators and respirators. A cover 170 is similar to that of the cover 128 except that notches 172 are used to fasten the cover 170 in place. And while it is not shown, the cover 170 could have tabs similar to those of FIG. 5.

Figure 7:
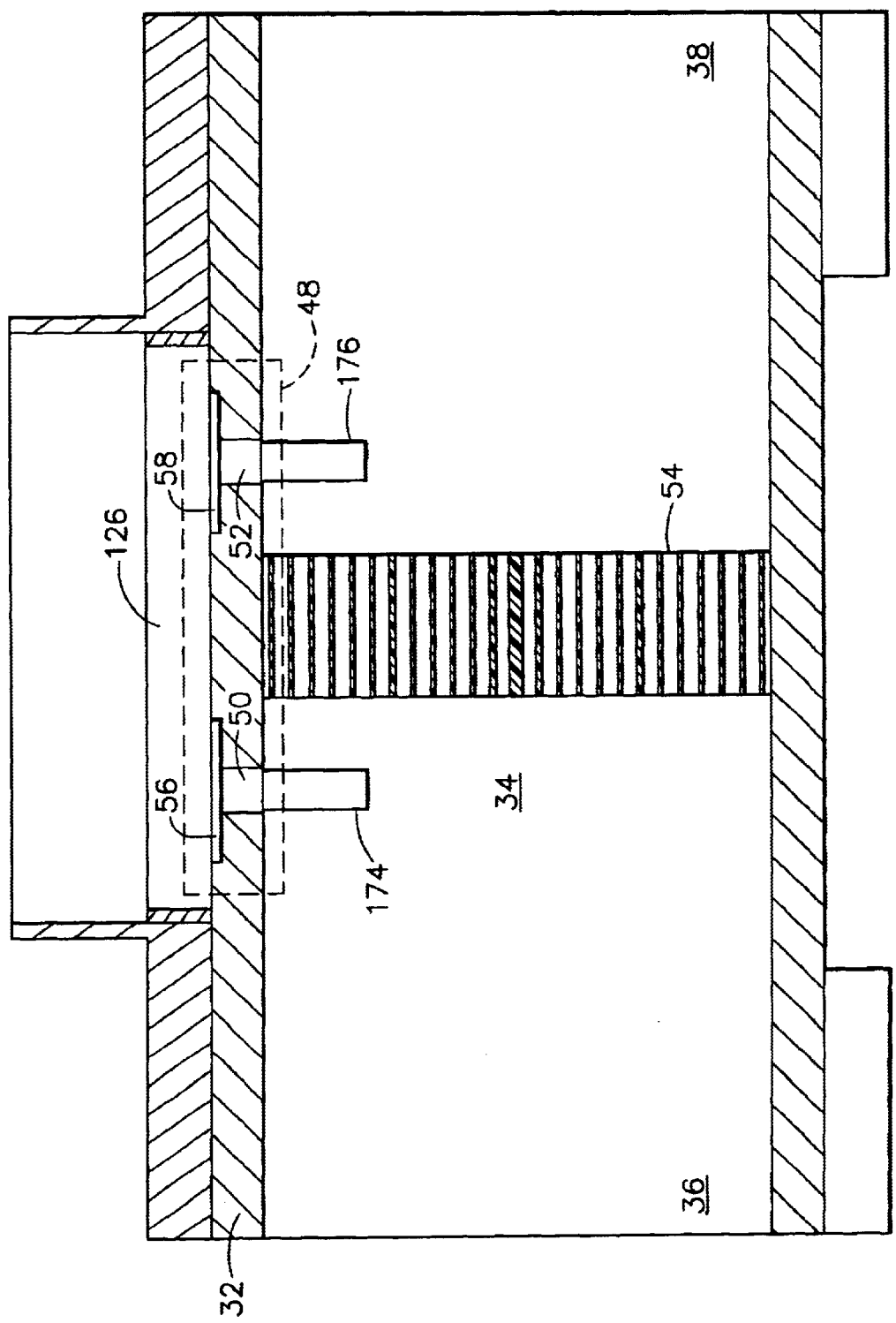
FIG. 7 is a cross-sectional view of the housing of FIG. 1 employing extension tubes to allow the module to be used with high flow rates.

In any of the previous embodiments, the flow channel 34 can be used to pass fluid of very high flow rates. For example, flow rate above 5,500 L/min can be achieved with a 3 inch diameter flow channel. It may be desirable, under high flow operating conditions however, to deploy extensions to the inlet end 50 and outlet end 52 of the sensing tap 48. In FIG. 7 exemplary extensions are shown as narrow hollow tubes 174,176, respectively. These tubes 174,176 magnify the pressure differential across the sensing channel 44 and further restrict the flow entering the sensing channel to prevent damage and reduce noise that could result from high flow rates. The tubes 174, 176 have a hollow core with a diameter approximately equal to that of the ends 50, 52 and are aligned to extend the same distance into the channel 34 from each respective end.

An advantage of the embodiments depicted in FIGS. 5–7 is that the sensor 42 can be calibrated to produce accurate flow rate measurements for a given flow restrictor. To calibrate the integrated module 30 or 146, first, testing is performed at no flow conditions to measure the null output of the sensor 42. The gain stage feedback resistor of a gain amplifier (not shown but disposed on control circuitry connected to either the sensor 42 or the substrate 98) is trimmed until the sensor output is at a predetermined voltage, such as 1V. Second, a fluid flowing at a known flow rate such as 200 L/min is passed through the flow channel 34 producing a voltage output from the sensor 42. The gain stage of the sensor 42 is further trimmed at this operating output to a predetermined voltage, such as 6V. In this way, the sensor is calibrated to produce output voltages over a defined range compatible with the functional voltage input ranges of any connecting circuitry. Furthermore, by calibrating the output range in this manner, sensitive flow sensors may be used thus allowing the flow rate of gases to be readily measured.

While in the preferred embodiment the flow restrictor 54 is that of FIG. 2, in any of the embodiments of FIGS. 5–7 other known flow restrictors, such as a orifice-based flow restrictor or a honeycomb flow restrictor, can be used. However, these flow restrictors may create pressure drops across the sensing channel but are not adapted for use with a particular flow channel in that they do not reduce turbulence uniformly across the entire flow channel 34, as occurs with the concentrically orificed flow restrictor 54.

Figure 8:
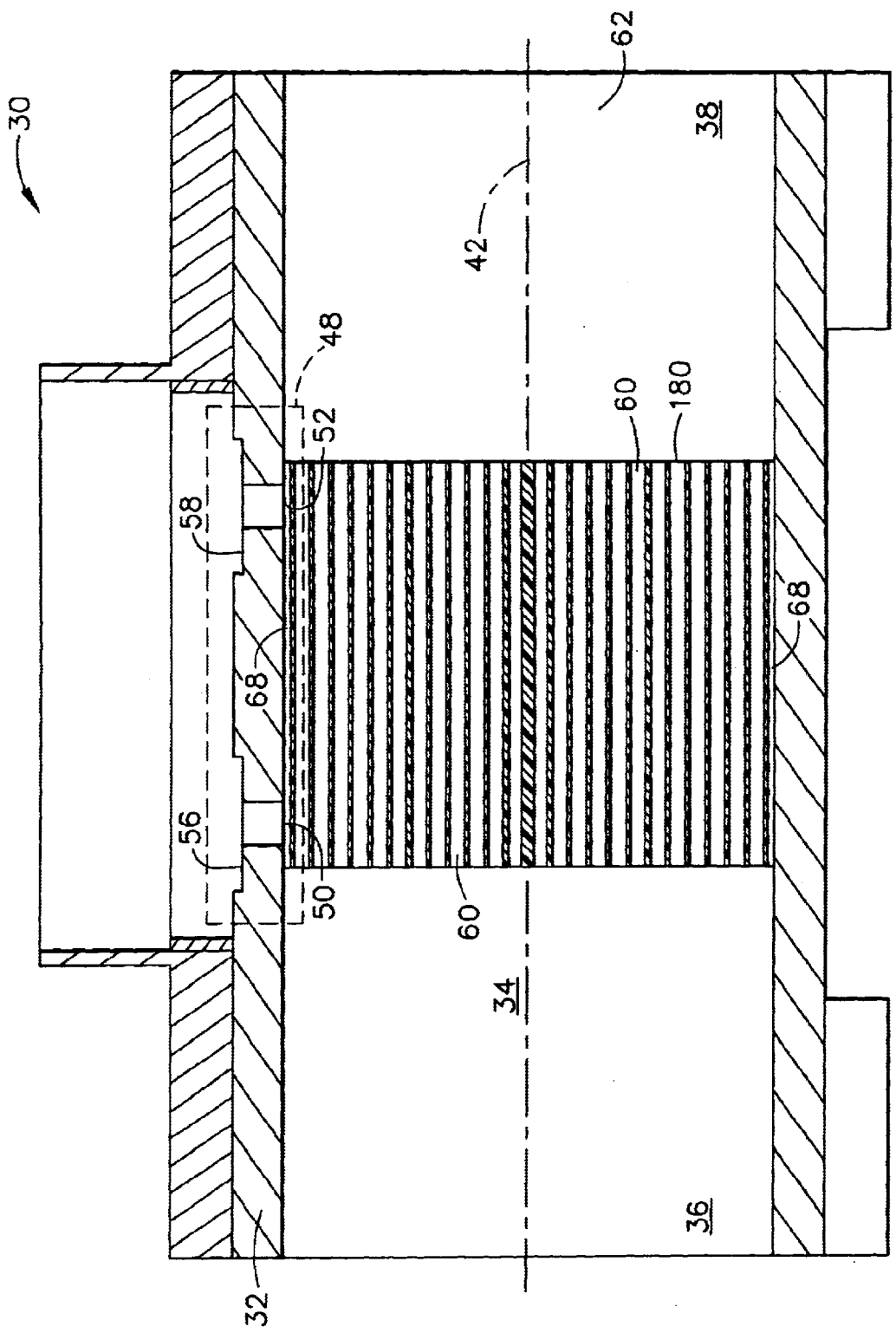
FIG. 8 is a cross-sectional view of an integrated module with a flow restrictor extending beyond an inlet and an outlet tap of the sensing tap of the flow channel according to a third embodiment of the invention that may be implemented in a similar manner to the first and second embodiments.

In addition, in any of the above embodiments a flow restrictor 180, which is identical to the flow restrictor 54 but longer, may extend beyond the inlet end 50 and outlet end 52 of the sensing tap 48 as shown in FIG. 8. In such an embodiment, the sensor 42 (not shown) measures the flow rate based on the pressure drop between the inlet end 50 and the outlet end 52 of the sensing channel 44. Though these two ends 50, 52 are not disposed outside of the flow restrictor 180, there will be a pressure drop between the two (as well as a laminarizing of the flow), from which the sensor 42 can measure flow rate. Pressure drop, i.e., pressure differential, is created in primarily three ways by a flow restrictor. First, a pressure drop is created as the fluid enters the restrictor. Second, a further pressure drop is created as the fluid exits the restrictor. Third, a still further pressure drop occurs as the fluid is flowing through the flow restrictor. In the embodiment of FIG. 1, the sensor 42 measures flow rate based upon a pressure drop across the sensing channel 44 from all three factors because the inlet tap 50 and outlet tap 52 are disposed on opposite sides of the flow restrictor 54. Whereas, with the longer flow restrictor 180, the sensor 42 will measure a flow rate based upon a smaller pressure drop that includes the drop in pressure due to the first and third factors described above, because the flow restrictor 180 extends beyond the taps 50, 52. An advantage of using this longer flow restrictor arrangement, is that a longer flow restrictor produces a more laminar flow with less noise measured by the sensor 42.

Figure 9:
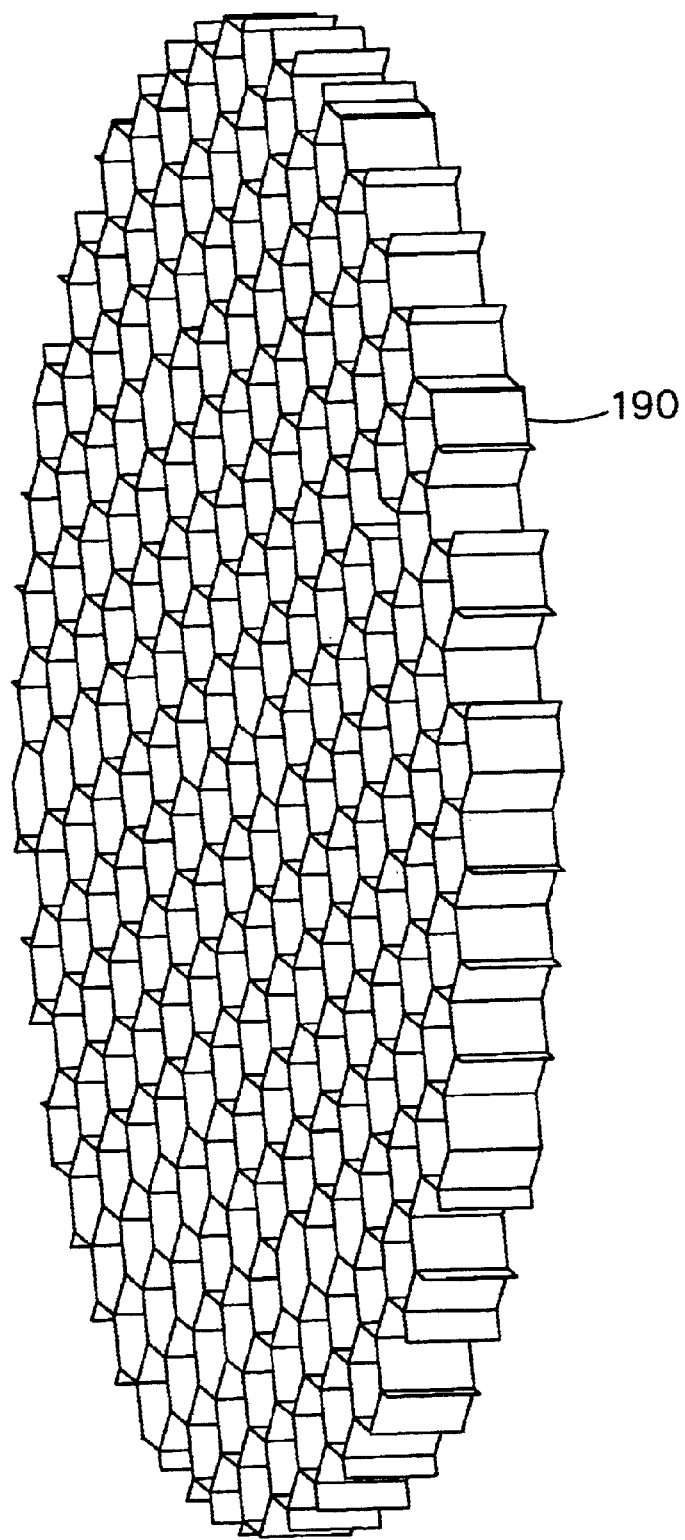
FIG. 9 is a trimetric view of an inlet or outlet screen of FIG. 1 showing a honeycomb patterned structure.

As shown by example in FIGS. 1, 5 and 6, the inlet screen 62 and the outlet screen 64 may be used to further straighten and laminarize the flow as well as reduce the Reynold's number in the flow channel 34. The inlet and outlet screens 62, 64 may be any type of flow laminarizer, including a honeycomb-patterned screen 190 (FIG. 9), a woven polyester, or a structure similar to the flow restrictors 54 180.

Figure 10:
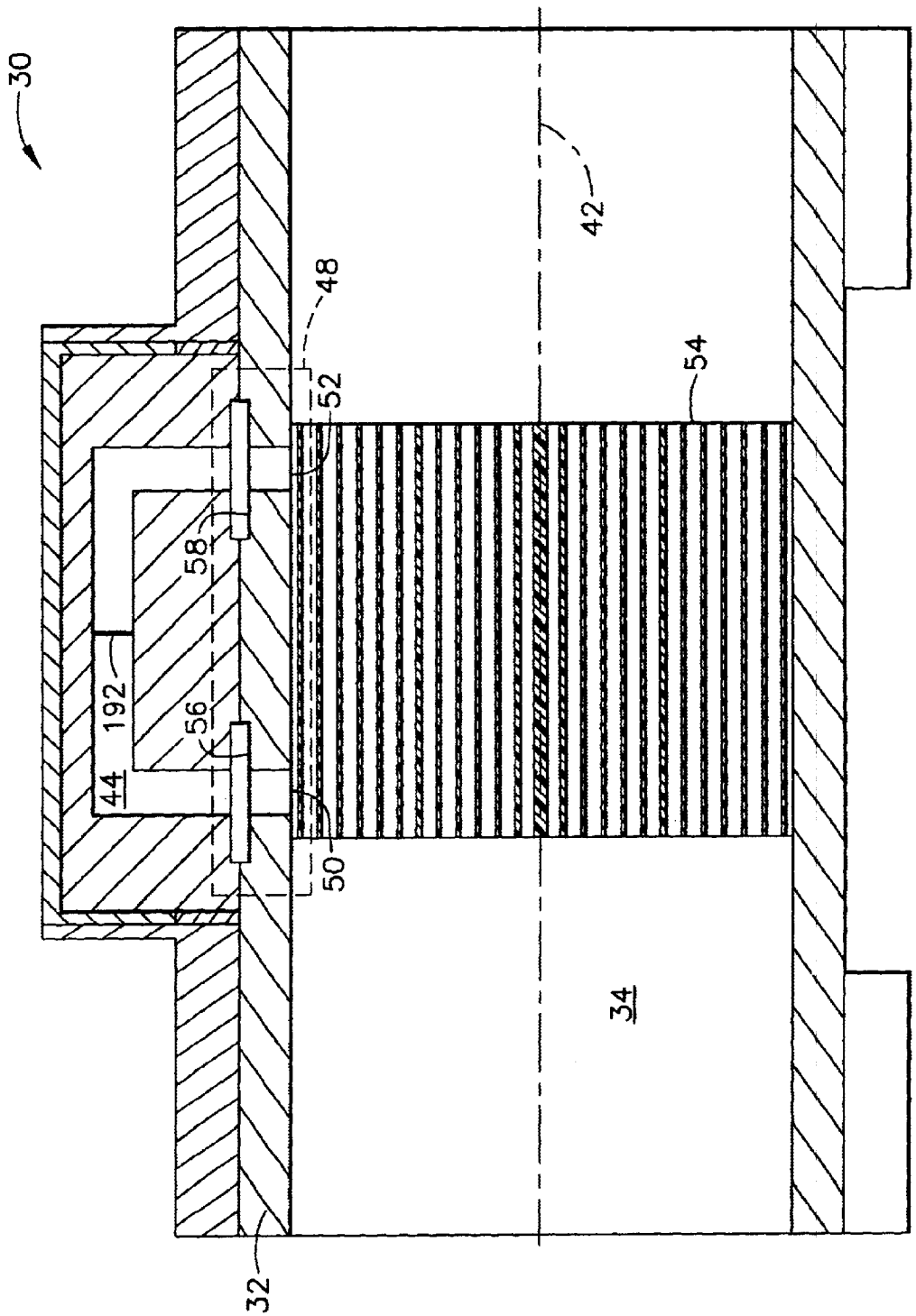
FIG. 10 is a cross-sectional view of a variation of any of the embodiments shown in FIGS. 5–8 in which a pressure sensor is disposed in a channel communicating with a flow channel of the integrated module.

In the foregoing embodiments, a flow sensor in the form of a thermal microstructure is used. Alternatively as shown in FIG. 10, a differential pressure (ΔP) sensor 192 can be deployed in the channel 44 for measuring the pressure of the flowing fluid. The pressure differential created by the flow restrictor 54 between the inlet 50 and the outlet 52 is measured by the sensor 192 from which a flow rate of the fluid can be derived. The sensor 192 is positioned across the sensing channel 44, thus precluding the flow of fluid across the channel 44.

Those of ordinary skill in the art will appreciate that, although the teachings of the invention have been illustrated in connection with certain embodiments, there is no intent to limit the invention to such embodiments. On the contrary, the intention of this patent is to cover all modifications and embodiments fairly falling within the scope of the appended claims either literally or under the doctrine of equivalents.

What we claim is:

1. A uniform flow apparatus comprising:
   a housing having a wall that defines a flow channel through which fluid flows, wherein the flow channel has a central axis; and
   a flow restrictor, with an entrance end and an exit end, disposed in the flow channel, wherein the flow restrictor comprises a plurality of orifices following a contour of the flow channel, wherein the orifices are distributed uniformly along a line extending from the central axis to the wall, and wherein the orifices produce a substantially uniform flow across the flow channel at the exit end.

2. An apparatus comprising:
   a housing that defines a flow channel through which fluid flows; and,
   a flow restrictor, wherein the flow restrictor has an entrance end and an exit end and is disposed in the flow channel, wherein the flow restrictor comprises at least three orifices distributed in parallel along a line extending perpendicularly from a longitudinal axis of the flow channel, and wherein each of the orifices has a shape about the longitudinal axis matching a shape of the flow channel so as to produce a substantially uniform flow across the flow channel at the exit end.

3. The apparatus of claim 2, wherein the flow channel has an outer wall of circular cross-sectional shape, and wherein the orifices are circular orifices aligned concentrically about the longitudinal axis.

4. The apparatus of claim 3, wherein the flow restrictor further comprises a plurality of support pairs formed of two supports aligned radially on opposing sides of the longitudinal axis and disposed to define pairs of circular orifices of substantially identical shape and radial position.

5. The apparatus of claim 4, wherein at least one of the orifices has substantially similar hydraulic diameter to at least one other of the orifices.

6. The apparatus of claim 2, wherein the flow restrictor is formed of a resin.

7. The apparatus of claim 6, wherein the resin is a nylon resin.

8. The apparatus of claim 2, wherein the housing comprises an inlet end with an inlet mount and an outlet end with an outlet mount, and wherein the inlet mount and the outlet mount are adapted for coupling the apparatus to a flow system.

9. The apparatus of claim 8, wherein the housing and the inlet mount and the outlet mount are singularly formed in a molded structure.

10. The apparatus of claim 8, wherein the inlet mount is affixably mounted to the inlet end and wherein the outlet mount is affixably mounted to the outlet end.

11. The apparatus of claim 2, wherein the housing includes at least one sensing tap into which a portion of the fluid flows, wherein said apparatus further comprises a sensor mounted to the sensing tap, and wherein the sensor measures a property of the fluid corresponding to a flow rate.

12. The apparatus of claim 11, wherein the sensor is affixably mounted to the housing to form a substantially fluid-tight seal with the sensing tap.

13. The apparatus of claim 11, wherein the sensing tap has an inlet end and an outlet end, and wherein the sensor is mounted to the sensing tap to define a sensing channel.

14. The apparatus of claim 13, wherein the flow restrictor is disposed in the flow channel such that the sensing inlet and the sensing outlet are disposed on opposite, non-adjacent sides of the entrance end and the exit end.

15. The apparatus of claim 13, wherein the flow restrictor is disposed in the flow channel such that the sensing inlet and the sensing outlet are disposed between opposite, non-adjacent sides of the entrance end and the exit end.

16. The apparatus of claim 11, wherein the sensor is mounted to the sensing tap through a flow tube affixably mounted to the sensor and to the sensing tap, wherein the sensing tap has an inlet end and an outlet end, and wherein hat the flow tube defines a sensing channel between the sensing inlet and the sensing outlet.

17. The apparatus of claim 11, wherein the sensor comprises a thermal microstructure sensor.

18. The apparatus of claim 11, wherein the sensor comprises a pressure sensor.

19. The apparatus of claim 11, wherein the sensing tap has an inlet and an outlet end, and wherein the sensor is a flow sensor mounted to the sensing tap to define a sensing channel between the sensing tap inlet and the sensing tap outlet.

20. The apparatus of claim 2, wherein the housing comprises a turbulence reducing inlet screen disposed upstream of the flow channel and a turbulence reducing outlet screen disposed downstream of the flow channel.

21. The apparatus of claim 20, wherein the inlet screen and the outlet screen each comprises a honeycomb-patterned laminarizing structure.

22. The apparatus of claim 2, wherein the flow channel has an outer wall of circular cross-sectional shape, and wherein the orifices are circular orifices.

23. A module for measuring a flow rate of a fluid in a flow system, the module comprising:
   a flow restrictor disposed in a flow channel, wherein the flow restrictor creates a pressure drop;
   a sensing channel having an inlet and an outlet, wherein the inlet and the outlet communicate with the flow channel such that the pressure drop forces a portion of a fluid in the flow channel to flow through the sensing channel;
   a flow sensor disposed in the sensing channel, wherein the flow sensor senses the flow of fluid through the sensing channel; and,
   a housing fastened to the flow channel and containing the flow sensor and the sensing channel.

24. The module of claim 23, further comprising an inlet mount and an outlet mount, both mounts being adapted for connecting the module to the flow system.

25. The module of claim 23, wherein the flow sensor comprises a thermal microstructure sensor.

26. The module of claim 23, wherein the flow restrictor comprises a plurality of orifices adapted to produce a substantially uniform flow across the flow channel.

27. The module of claim 23, wherein the flow restrictor comprises a honeycomb-patterned structure.

28. The module of claim 23 wherein the flow restrictor comprises a plurality of orifices following a contour of the flow channel, wherein the orifices are distributed uniformly along a line extending perpendicularly from the central axis to the wall, and wherein the orifices produce a substantially uniform flow across the flow channel at the exit end.

29. A flow restrictor having a longitudinal axis and comprising n orifices distributed along a line that is perpendicular to the longitudinal axis, wherein the n orifices are parallel to one another, wherein the n orifices have different cross-sectional areas, wherein the n orifices produce a substantially uniform flow across a flow channel, and wherein n>2.

30. The flow restrictor of claim 29, wherein the n orifices comprise n circular orifices.

31. The flow restrictor of claim 29, wherein the n orifices comprise n circular orifices aligned concentrically about the longitudinal axis and extending along the longitudinal axis.

32. The flow restrictor of claim 31, wherein the flow restrictor comprises a plurality of radial supports.

33. The flow restrictor of claim 32, wherein the flow restrictor is formed of a resin or plastic.

34. The flow restrictor of claim 33, wherein the resin comprises a nylon resin.

* * * * *